Figure 1:
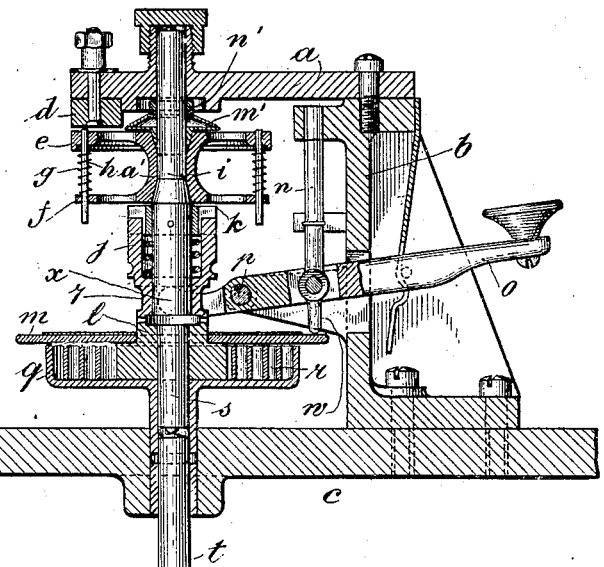

No. 832,035. PATENTED OCT. 2, 1906.
C. L. BUCKINGHAM & E. GERMANN.
FEEDING MECHANISM FOR PERFORATING MACHINES FOR PREPARING
TELEGRAPHIC MESSAGES FOR AUTOMATIC TRANSMISSION.
APPLICATION FILED AUG. 25, 1902.

4 SHEETS—SHEET 1.

WITNESSES:
F. N. Roehrich
John C. Sanders

INVENTORS
C. L. Buckingham
E. Germann
BY
C. L. Buckingham
ATTORNEY

No. 832,035. PATENTED OCT. 2, 1906.
C. L. BUCKINGHAM & E. GERMANN.
FEEDING MECHANISM FOR PERFORATING MACHINES FOR PREPARING TELEGRAPHIC MESSAGES FOR AUTOMATIC TRANSMISSION.
APPLICATION FILED AUG. 25, 1902.
4 SHEETS—SHEET 2.
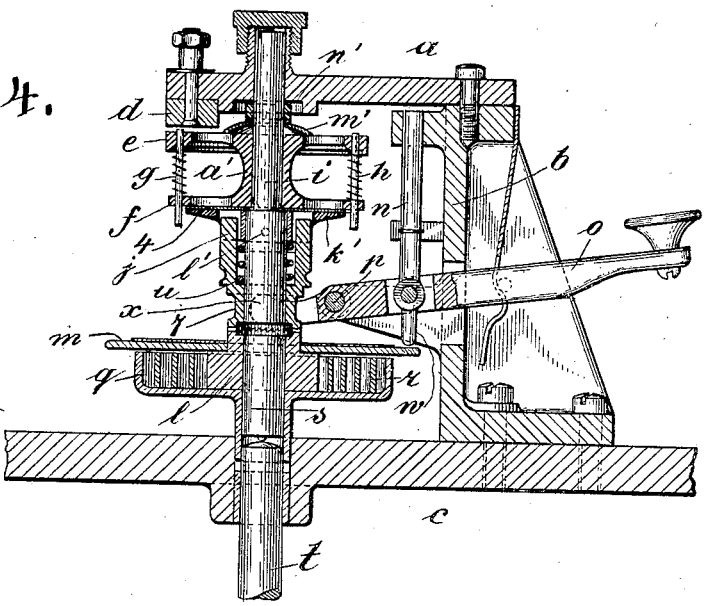
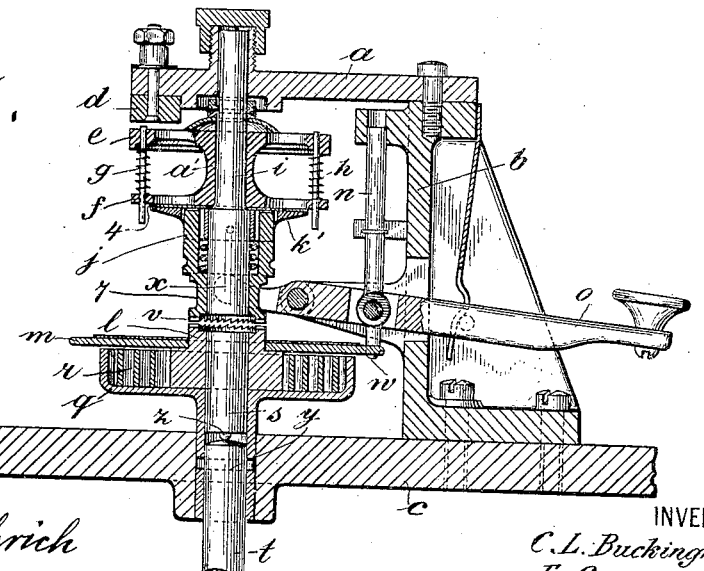
WITNESSES:
F. N. Roehrich
John C. Sanders
INVENTORS
C. L. Buckingham
E. Germann
BY
ATTORNEY No. 832,035. PATENTED OCT. 2, 1906.
C. L. BUCKINGHAM & E. GERMANN.
FEEDING MECHANISM FOR PERFORATING MACHINES FOR PREPARING
TELEGRAPHIC MESSAGES FOR AUTOMATIC TRANSMISSION.
APPLICATION FILED AUG. 25, 1902.
4 SHEETS—SHEET 3.
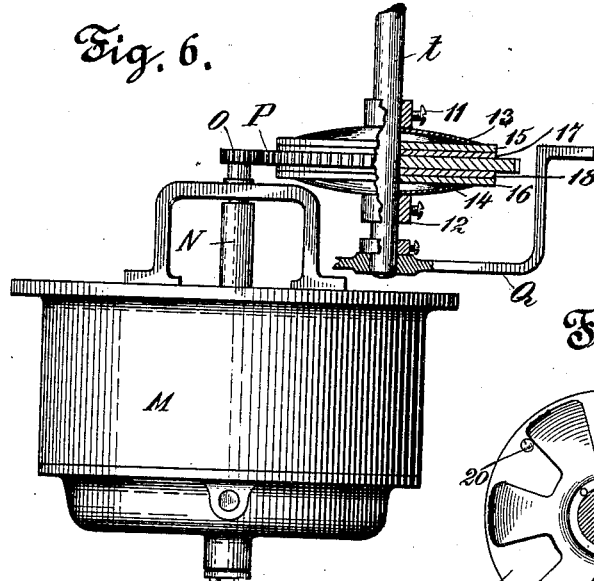
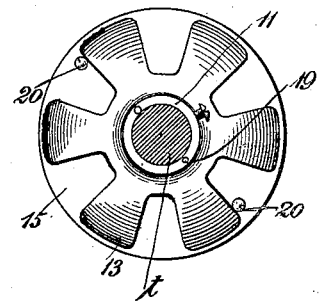
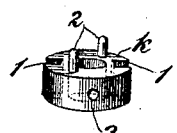
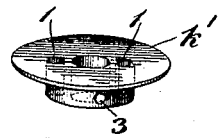
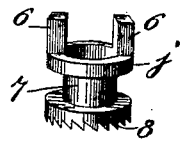
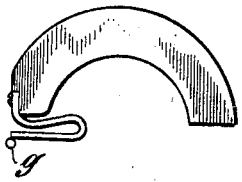
WITNESSES:
F. N. Roehrich
John C. Sanders
INVENTORS
C. L. Buckingham
E. Germann
BY
C. L. Buckingham
ATTORNEY No. 832,035. PATENTED OCT. 2, 1906.
C. L. BUCKINGHAM & E. GERMANN.
FEEDING MECHANISM FOR PERFORATING MACHINES FOR PREPARING
TELEGRAPHIC MESSAGES FOR AUTOMATIC TRANSMISSION.
APPLICATION FILED AUG. 25, 1902.

4 SHEETS—SHEET 4.

WITNESSES:
F. N. Roehrich
John C. Sanders

INVENTORS
C. L. Buckingham
E. Germann
BY
C. L. Buckingham
ATTORNEY

UNITED STATES PATENT OFFICE.

CHARLES L. BUCKINGHAM, OF NEW YORK, AND EMIL GERMANN, OF BROOKLYN, NEW YORK; SAID GERMANN ASSIGNOR TO SAID BUCKINGHAM.

FEEDING MECHANISM FOR PERFORATING-MACHINES FOR PREPARING TELEGRAPHIC MESSAGES FOR AUTOMATIC TRANSMISSION.

No. 832,035.　　　　　Specification of Letters Patent.　　　　　Patented Oct. 2, 1906.

Application filed August 25, 1902. Serial No. 120,950.

*To all whom it may concern:*

Be it known that we, CHARLES L. BUCKINGHAM, of the city and county of New York, and EMIL GERMANN, of Brooklyn, Kings county, State of New York, citizens of the United States of America, have made a new and useful Improvement in Feeding Mechanism for Perforating-Machines for Preparing Telegraphic Messages for Automatic Transmission, of which the following is a specification.

In perforating-machines of the Buckingham system as heretofore constructed and used the feed-wheel for moving the paper tape step by step as characters are successively perforated is driven by a motor fed with an unbroken supply of current, said wheel and motor being flexibly connected together by a long spiral spring. Such spring during the continuous operation of the machine is kept under a substantially uniform tension, considerably less than a maximum; but when the operator ceases perforating the motor continues to run and to thereby increase the tension until a resisting force balancing the torque of the motor is established. Under these conditions the tension of the spring after the motor has come to rest is far greater than that during the normal operation of the machine, and a force is developed which subjects the pins of the feed-wheel to heavy and destructive blows. Moreover, after the spring has been tightly wound and the motor has come to rest it often occurs that the latter will not start until the spring has in a large degree become unwound, and in many instances where the starting torque of the motor is not uniform or where there is a tendency to dead-points there is not left in the spring a sufficient tension to operate the feed-wheel while the motor is starting and attaining speed. To avoid these difficulties, we have frictionally connected the motor with the feed-wheel and have adapted the former to rotate at all times and to constantly impart a uniform torque to the feed-wheel during both the normal operation of the machine and immediately upon the resumption of perforating, and we have further made provision for minimizing the blows sustained by the pins of the feed-wheel and other parts as they are arrested by the stationary stop. By these means not only are we enabled at all times to apply a uniform maximum force to drive the wheel, but it is made possible to increase such driving force above limits that would not be allowable if there were no provision for softening the blows between the pins of the feed-wheel and the stationary stop.

Figure 2:
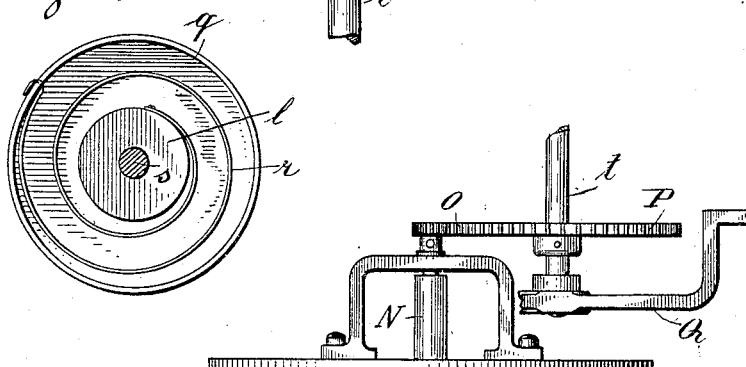
Figure 3:
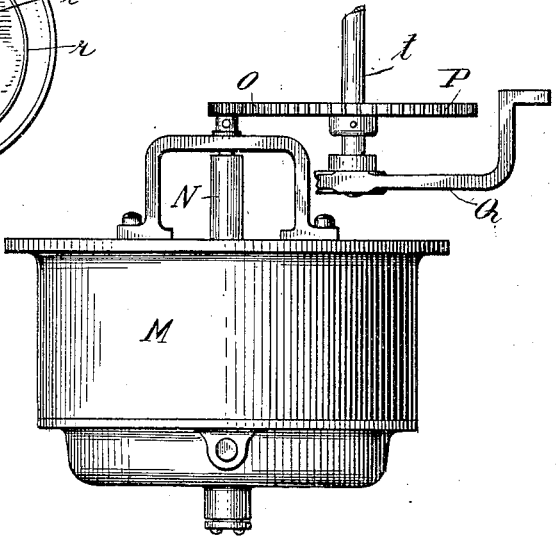
Figure 7:
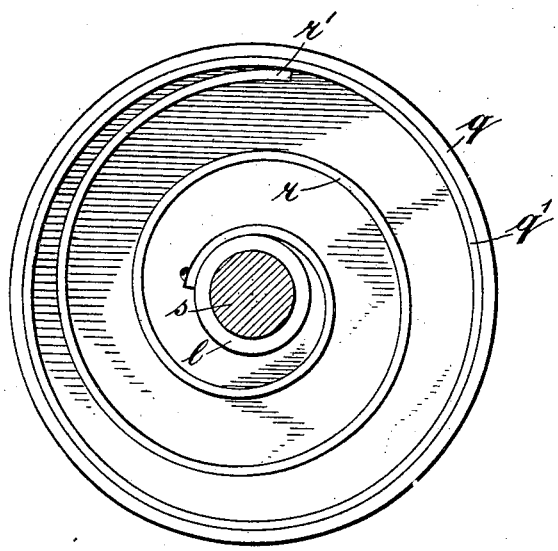
Figure 8:
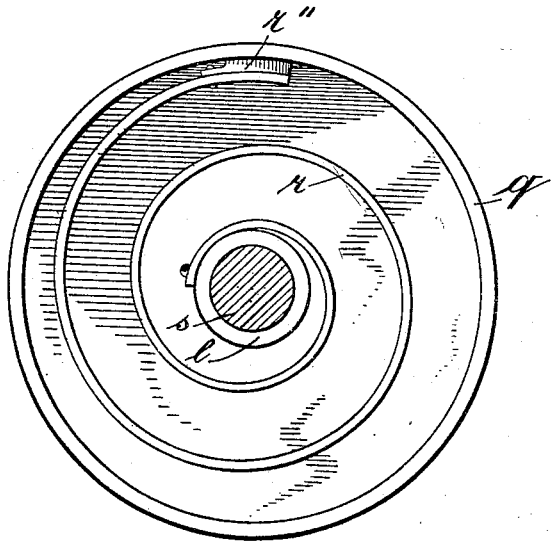

Figure 1 is a view, partially in section, showing the old form of feed-wheel, the manner of mounting the same upon its shaft, and the spring connection between the feed-wheel and the motor-shafts. Fig. 2 is a top view of the spring for joining the motor and feed-wheel shafts and the barrel within which said spring is housed. Fig. 3 shows an electric motor and gearing through which the motor-armature drives a shaft by which the spring shown in Fig. 2 is wound. Fig. 4 is a side view, partially in section, showing the parts represented in Fig. 1 and in addition a yielding connection between the feed-wheel and its shaft. Fig. 5 represents the structure shown in Fig. 4 with only the difference that the feed-wheel and its shaft are disconnected from the motor-driving arrangement. Fig. 6 shows a modification of the arrangement of Fig. 3, in that it illustrates a friction-clutch whereby the armature of the motor may continuously rotate while the feed-wheel is arrested. Fig. 7 shows the spiral spring and drum of Fig. 2, excepting that the outer end of said spring is retained in frictional connection with the drum, whereby the driving-motor may continue its rotation while the feed-wheel is arrested. Fig. 8 is a modification of the arrangement of Fig. 7, in that it shows upon the outer end of the spiral spring a leather or fiber shoe, whereas in Fig. 7 the unshod end of the spring is in rotating relation with a fiber lining. Fig. 9 is a perspective view of a collar *k*, which is adapted to be pinned upon the feed-wheel shaft, as shown in Fig. 1. Fig. 10 is a perspective view of a like collar, upon the upper surface of which is formed a flat disk surface whereby the feed-wheel shown in Figs. 4 and 5 may be yieldingly mounted upon its shaft. Fig. 11 shows a vertically-movable clutch for uncoupling the feed-wheel from the driving-motor, the upper wings of which are adapted to engage with the collars of Figs. 9 and 10. Fig. 12 is a circular disk of billiard-cloth or other suitable material which is adapted to be placed upon the metallic disk of Fig. 10 and upon which presses the lower disk of the feed-wheel, as shown in Figs. 4 and 5. Fig. 13 is a perspective view showing in detail the clutch for frictionally joining the continuously-driven motor with the feed-wheel when the latter is at rest. Fig. 14 shows a flexible stop for reducing the blow or impact between the feed-wheel pins and the stationary stop by which they are arrested.

Referring to the accompanying drawings, Figs. 1, 2, 3, 9, and 11 present those parts of the feed-wheel mechanism of our United States Patent No. 659,433, of October 9, 1900, with which our present improvements have been combined. As here shown, $c$ is the horizontal top plate of our perforator, $b$ an upright bracket fastened upon $c$, and $a$ a horizontal plate mounted upon $b$, within which the upper end of the feed-wheel shaft $i$ is journaled. The feed-wheel consists, essentially, of a hub $a'$ and two horizontal disks $e\ f$, integrally formed therewith, the disks each being provided with a circular series of circular apertures, those of the upper disk being immediately above those of the lower, within which are placed the pins $g$, each being surrounded by a tight-fitting spiral spring $h$, and as springs $h$ are confined between disks $e\ f$ a pin once driven upward will be frictionally retained in an upward position against gravity until driven downward, where it will likewise be held. The springs must suffice to hold the pins against gravity, but not offer a resistance that would prevent them from being easily driven up or down by the lifting and depressing arms employed for that purpose. As shown in Fig. 1, the feed-wheel is rigidly fixed to its shaft $i$ by a collar $k$, which is joined to the shaft, a pin being forced through aperture 3 and a corresponding hole in the shaft, while upon the upper surface of collar $k$ are pins 2, which project upwardly into apertures penetrating the lower surface of the feed-wheel. To communicate driving force from the motor to the feed-wheel while affording means for detaching the feed-wheel from the motor, the collar $k$ is provided with vertical peripheral recesses 1 1, within which engage upwardly-projecting arms 6 6 of clutch $j$, whose serrated teeth 8 mesh with the crown-teeth on the upper end of a wheel $l$, mounted upon the lower end of a short shaft $s$. (More particularly shown in Figs. 4 and 5.) Shaft $s$ is an extension of shaft $i$, and in normal operation the feed-wheel shaft consists of two parts $i\ s$, upon the latter of which is rigidly fixed a hub $l$, to which is fastened the inner end of spring $r$, whose opposite end is attached to the periphery of drum $q$, having a downwardly-projecting thimble, the latter being pinned to shaft $t$. It is thus seen that as shaft $N$ of motor $M$ is turned pinion $O$, meshing with gear-wheel $P$, gives rotation to shaft $t$ and that the latter, having a bracket $Q$ as a support, is rotated, and with it the barrel $q$, thereby imparting tension to spring $r$ to rotate hub $l$ and the shaft of the feed-wheel.

If a pin of the feed-wheel were unengaged with stop $d$, the feed-wheel and its shaft would continuously rotate with the motor; but if the feed-wheel were arrested the motor would only continue to rotate until spring $r$ had been sufficiently wound to arrest the motor-armature, it being assumed that the motor is fed with an undiminished voltage after its armature is at rest.

Well-constructed motors, if kept in good repair, may be given a starting torque of comparative uniformity; but the merest derangement of parts due to the wearing of the commutator or of its brushes or to oxidation will make the operation of the feed-wheel of our perforator defective and uncertain. Moreover, a force which will maintain machinery in motion is insufficient to start such machinery from rest. A motor of the commutator or other type may be depended upon to continue in rotation at a comparatively uniform speed under a uniform load, whatever its derangements; but to maintain in a motor a capacity to stand ready to start from rest with a uniform torque at all points of rotation is a practical impossibility. Obviously upon arresting the feed-wheel with the motor in rotation spring $r$ would be wound to a tension such that after the motor had come to a stop the current flowing through it would be insufficient to again start the armature, excepting as spring $r$ had been relieved of a very considerable part of its resisting tension. Thus if after the motor had come to rest the feed-wheel were released it would be actuated by a force far exceeding that which would be imparted by the spring $r$ when partially unwound, as is the case during the normal operation of the machine, and not only would the blows of the pins upon the fixed stop be inordinately heavy as the operator began work, but before the motor could start spring $r$ would have become so far unwound or relieved of its tension as to afford only an insufficient driving force. To overcome this difficulty, the motor-armature is kept in continuous rotation—a result which may be accomplished in a variety of ways. As shown in Fig. 6, shaft $t$ is frictionally joined with the armature of motor $M$. The same pinion $O$ and gear-wheel $P$ are employed as in Fig. 3; but wheel $P$ in Fig. 6 is frictionally connected with shaft $t$. The upper and lower surfaces of $P$ are flat and smooth. Below $P$ is a collar 12, which is rigidly attached to shaft $t$, while to said collar is rigidly attached a cup-shaped spring 14, whose upwardly-projecting edges support a metallic disk 16, to which it imparts rotation. Upon the upper smooth surface of 16 is placed a disk of billiard-cloth, against which P is downwardly pressed by an arrangement of collar, spring, and disk similar to those supporting wheel P; but in this case spring 13 presses downward upon metallic disk 15, while between the lower surface of the latter and the upper surface of wheel P is placed the disk of billiard-cloth.

As shown in Fig. 13, collar 11 is fixed to shaft $t$ by a radial screw, while to collar 11 is pinned the spring 13 by vertical pins 19, and rotation is imparted to spring 13, parts of which are cut away by upwardly-projecting pins 20. The same fastenings are equally applicable below wheel P. It is thus seen that metallic disks 15 and 16 above and below wheel P may be pressed together with such tension as may be required and that the compresed disks of billiard-cloth may be relied upon for a frictional connection between shaft $t$ and wheel P, and that P may thus serve to drive shaft $t$ whenever the feed-wheel is released or permit rotation of the motor when the shaft $t$ is arrested. In this arrangement we prefer to employ spring $r$, as shown in Fig. 2, with one end connected to the periphery of barrel $q$ and the other to hub $l$. By properly adjusting the friction with which the clutch of Fig. 6 is turned the spring of Fig. 2 may be wound to any desired tension; but if the spring were wound to a far less tension than would be necessary if the motor-armature were directly geared with barrel $q$ a force of adequate strength would be secured. Substantially the same result is accomplished by the arrangement shown in Figs. 7 and 8. In these cases, however, shaft $t$ throughout its entire length is given continuous rotation. In the arrangement of Fig. 7 barrel $q$ is lined with fiber $q'$, while the outer end $r'$ of spring $r$ is pressed within the turning periphery, and by this means sufficient power is stored in the spring to intermittently drive the feed-wheel shaft.

The arrangement of Fig. 8 differs from that of Fig. 7 only in that a leather shoe $r''$, fastened upon the outer end of spring $r$, is in rubbing contact with the inner periphery of the constantly-rotating barrel.

As shown in Figs. 4 and 5, the feed-wheel is in frictional connection with its shaft $i$, but not in such light connection that the shaft may be freely turned by the power of the driving-motor when the feed-wheel is arrested. In this case upon arresting the feed-wheel shaft $i$ only turns within the wheel at the instant the wheel is arrested and only then a short peripheral distance of, say, not more than one-tenth or one-fourth of an inch; but by this means the severity of the impact is much reduced from the fact that the feed-wheel itself is much lighter than the shafting and other rotating parts with which it has heretofore been rigidly connected. For instance, in the old form it will be seen that not only had the feed-wheel itself to be arrested, but with it shaft $i$, collar $k$, clutch-piece $j$, shaft $s$, hub $l$, and the heavy locking-plate $m$, placed above the spring-barrel $q$. By thus reducing the blow between the pins of the feed-wheel and its stop $d$ a much greater force may be imparted to the feed-wheel shaft than would otherwise be possible without breaking the apparatus, and not only may a larger force be imparted without breaking pins of the feed-wheel, but this force may be made a constant maximum force by continuously rotating the motor. To frictionally mount the feed-wheel upon its shaft is accomplished by replacing collar $k$ of Fig. 9 by collar $k'$ of Fig. 10, the latter being pinned upon the feed-wheel shaft as was $k$, while between the lower disk of the feed-wheel and the upper surface of $k'$ is placed a disk of billiard-cloth 4, having a central opening 5, Fig. 12, the latter being tightly compressed between $k'$ and $f$ by a cup-shaped spring $m'$, pinned to shaft $i$ by collar $n$, whose peripheral edges press downward upon the upper surface of the feed-wheel. The disk collar $k'$ is also provided with vertical openings corresponding with 1 1 in collar $k$, Fig. 9, within which engage wings 6 6 of clutch $j$, Fig. 11. The purpose of these parts is seen in Figs. 4, 5. Within the groove 7 of clutch $j$ pass the prongs $x$ of a disengaging key $o$, which is pivoted at $p$. When depressed, as seen in Fig. 5, lever $o$ also depresses a vertical pin $n$, whose lower end $w$ is forced into one of the circular series of openings in the locking-plate $m$, thus locking the lower part of the feed-wheel shaft $s$ against rotation, while disengaging the teeth of clutch $j$ from teeth upon the upper end of shaft $s$. By this means the feed-wheel is disengaged from the motor and spring $r$ and is free to rotate in either direction, while by means of the locking-key, plate $m$ is retained in its wound condition. Other means for lessening the impact or blow between the feed-wheel pins and the fixed stop may be employed—such, for example, as the flexible stop of Fig. 14, in which is shown a crescent stop-piece, to one end of which is rigidly fixed one leg of a U-shaped spring, the other being free to give slightly. Flexible stops, however, while serviceable, have proved less satisfactory and durable than the arrangement of the feed-wheel frictionally affixed to its shaft, as shown in Figs. 4 and 5.

Any other power than that of an electric motor may be applied to drive the feed-wheel shaft. For example, a counter-shaft with numerous pulleys might be substituted for electric motors, with a pulley-belt from such shaft to each perforator.

Broadly, our invention contemplates the application of a maximum uniform force to a feed-wheel or other analogous device of minimum weight, yet of sufficient strength to withstand the blows it must sustain in being stopped with accuracy upon long feeds at predetermined points of rotation, the specific purpose being to apply the largest possible force to rotate the structure to give it great quickness of action without injury to the mechanism. Specifically, our improvement embodies an escapement-feed of irregular steps, in which the operation must be accomplished with extreme accuracy and quickness; but it is no less applicable to escapements whose feeds are of one length, where the steps are long and must be made with great quickness, if the weight of the apparatus is necessarily sufficient to cause a destructive impact between the rotating and fixed parts.

The frictional clutch for joining the motor with the feed-wheel in such manner that the motor may continue in rotation while the feed-wheel is arrested we prefer over other forms of apparatus for this purpose; but we do not wish to limit ourselves to apparatus in which one body rubs against another, for a clutch of a magnetic or an inductional type might equally well be used. We wish to broadly cover in this connection any form of clutch by which the motor may be allowed to continue in rotation while the feeding apparatus is arrested. It is also obvious that other forms of clutches than the one here shown might be employed for tightly connecting the feed-wheel upon its shaft. To accomplish the desired purpose, it is only necessary that the shaft be allowed to turn slightly with reference to the feed-wheel as the latter is arrested by a rigid stop. Obviously such result might be attained by connecting the feed-wheel to its shaft by a stiff spring, but such an arrangement would be more complicated and far less durable than the tight frictional connection.

Our impact-reducing apparatus for preserving the feed-wheel and stops against undue breakage and wear may or may not be resilient. In our preferred form, where the wheel is in tight frictional connection with its shaft, it is not resilient. It would be resilient, however, if the stop were elastic or if the wheel and shaft were connected by a spring; but if the stop were elastic or if the wheel and shaft were joined by a spring the spring effect should amount almost to rigidity and the backward movement due to the spring should be limited; otherwise there would be a rebound of the feed-wheel and a disturbance of the cross-alinement between the central and outer holes of the Wheatstone message-tape. A weak spring would be worse than no spring, for while it would not prevent breakage it would destroy the cross-alinement.

What we claim, and desire to secure by Letters Patent, is—

1. In a perforating-machine for preparing telegraphic messages or other analogous apparatus, the combination of a step-by-step feeding mechanism, a shaft for rotating the same, a motor for driving said shaft and a clutch connecting said motor and feeding apparatus, whereby the motor may continue in rotation while the feeding apparatus is locked in a fixed position.

2. In a perforating-machine for preparing telegraphic messages or other analogous apparatus, the combination of a step-by-step feed-wheel, a stop for arresting said feed-wheel, a motor for actuating said wheel and a blow-reducing mechanism whereby the impact that would otherwise result between the feed-wheel and stop may be lessened when said feed-wheel is arrested.

3. In a perforating-machine for preparing telegraphic messages or other analogous apparatus, the combination of a step-by-step feed-wheel, a shaft for imparting rotation to said feed-wheel, a driving-motor for actuating said shaft and a yielding connection between said shaft and feed-wheel, whereby said shaft may yield slightly and continue its rotation by a short space when said feed-wheel is arrested.

4. In a perforating-machine for preparing telegraphic messages or other analogous apparatus, the combination of a step-by-step feed-wheel, a shaft for imparting rotation to said feed-wheel, a driving-motor for actuating said shaft and a tight frictional connection between said shaft and feed-wheel, whereby said shaft may yield slightly and continue its rotation by a short space when said feed-wheel is arrested.

5. In a perforating-machine for preparing telegraphic messages for transmission or other analogous apparatus, the combination of a feed-wheel, a shaft with which said feed-wheel is connected with a tight frictional contact, a motor for driving said shaft and a frictional clutch connecting said shaft with said motor, whereby, as said shaft is held against rotation, the motor may continue to rotate.

6. In a perforating-machine for preparing telegraphic messages or other analogous apparatus, the combination of a feed-wheel, a rigid stop for arresting the same, a shaft joined with said feed-wheel by a tight frictional connection, a motor for driving said feed-wheel, a shaft frictionally connected with said motor and a spring, $r$, joining said motor-shaft with that upon which the feed-wheel is mounted.

7. In a perforating-machine for preparing telegraphic messages or other analogous apparatus, the combination of a feed-wheel, a stop for arresting the same, a shaft to which said feed-wheel is mounted by a tight frictional connection, a motor, a shaft driven thereby, and a spiral spring, $r$, for joining the shaft of said motor and feed-wheel, as and for the purpose set forth.

8. In a perforating-machine for preparing telegraphic messages or other analogous apparatus, the combination of a feed-wheel, a rigid stop for arresting the same, a shaft carrying said feed-wheel, and means for securing a tight frictional connection between said shaft and feed-wheel, consisting of a disk rigidly fixed to said shaft and a disk of billiard-cloth or other suitable material carried upon said disk against which the feed-wheel is tightly pressed, as and for the purpose set forth.

In testimony whereof we have signed our names to this specification in the presence of two subscribing witnesses.

CHARLES L. BUCKINGHAM.
EMIL GERMANN.

Witnesses:
G. R. BENJAMIN,
JOHN C. SANDERS.